Figure 1:
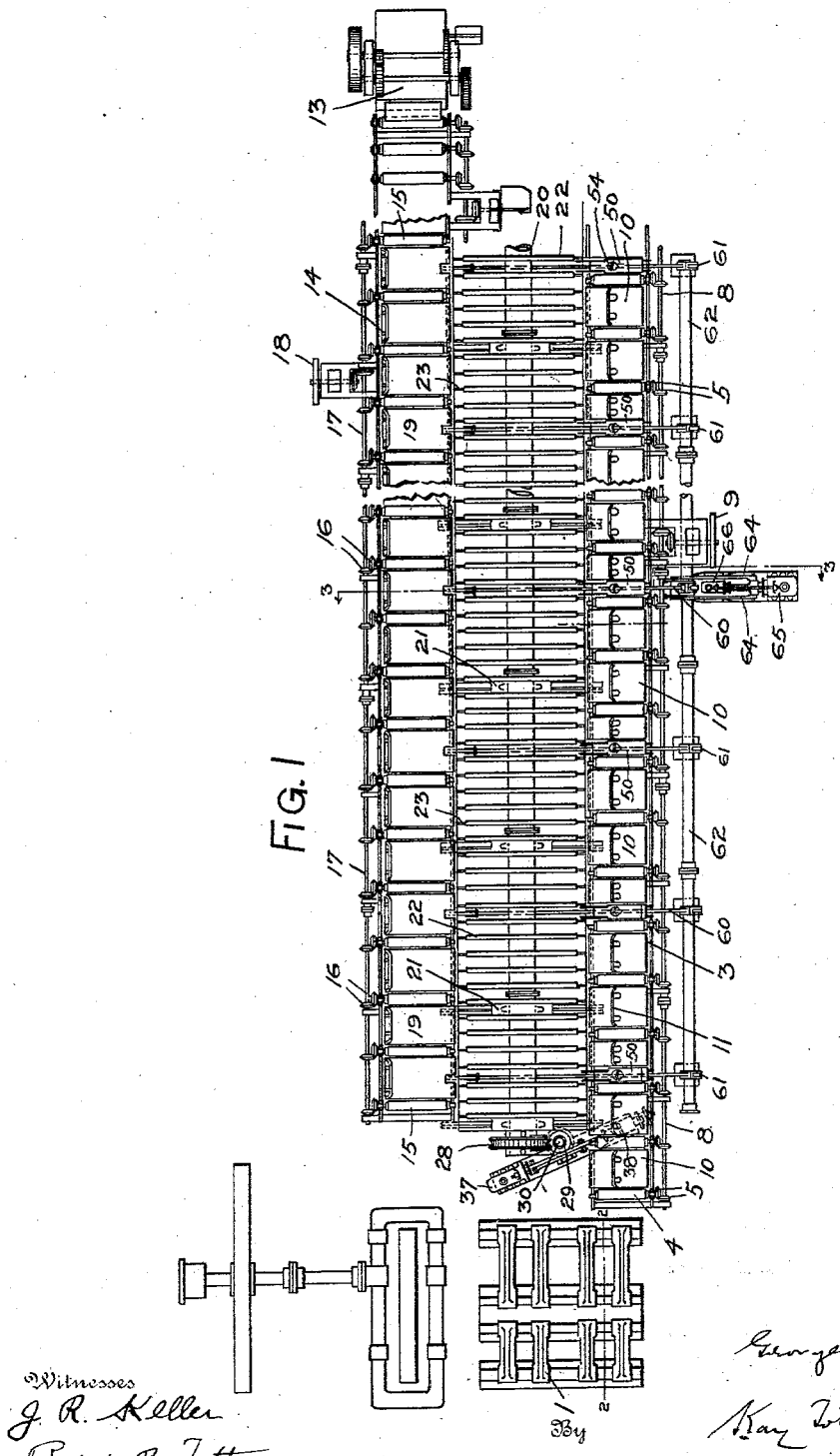

No. 753,293. PATENTED MAR. 1, 1904.
G. G. McMURTRY.
COOLING RACK FOR BARS.
APPLICATION FILED SEPT. 12, 1903.
NO MODEL. 5 SHEETS—SHEET 1.

No. 753,293. PATENTED MAR. 1, 1904.
G. G. McMURTRY.
COOLING RACK FOR BARS.
APPLICATION FILED SEPT. 12, 1903.
NO MODEL. 5 SHEETS—SHEET 2.

WITNESSES: INVENTOR
J. R. Keller George G. McMurtry
Robert C. Totten BY Kay Totten & Winter
Attorneys No. 753,293. PATENTED MAR. 1, 1904.
G. G. McMURTRY.
COOLING RACK FOR BARS.
APPLICATION FILED SEPT. 12, 1903.
NO MODEL. 5 SHEETS—SHEET 3.
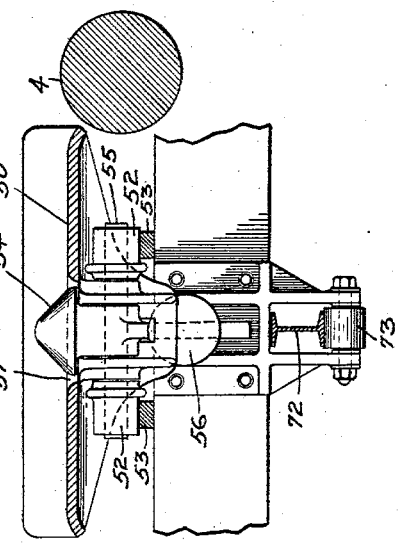
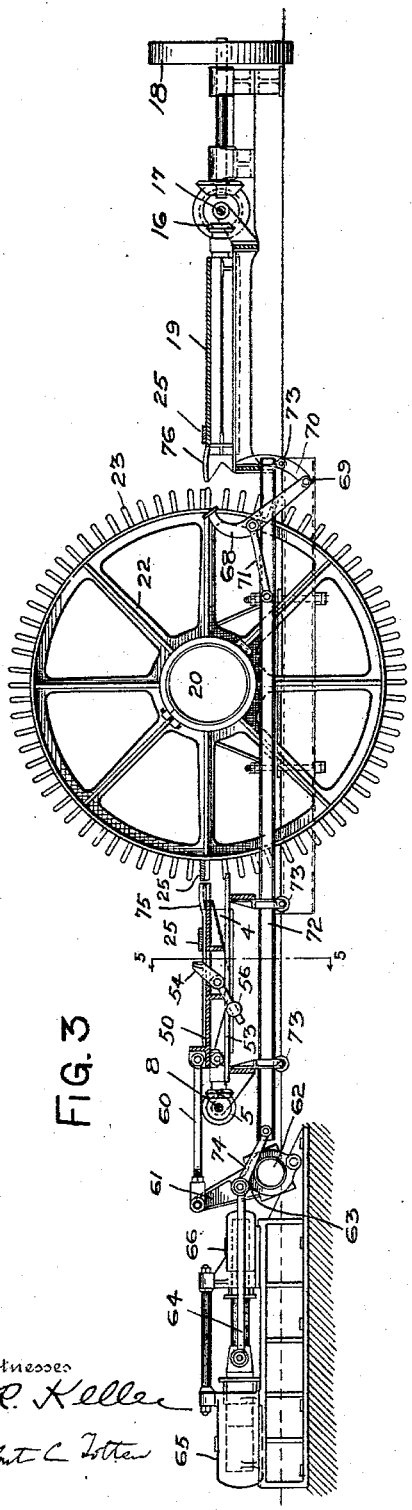
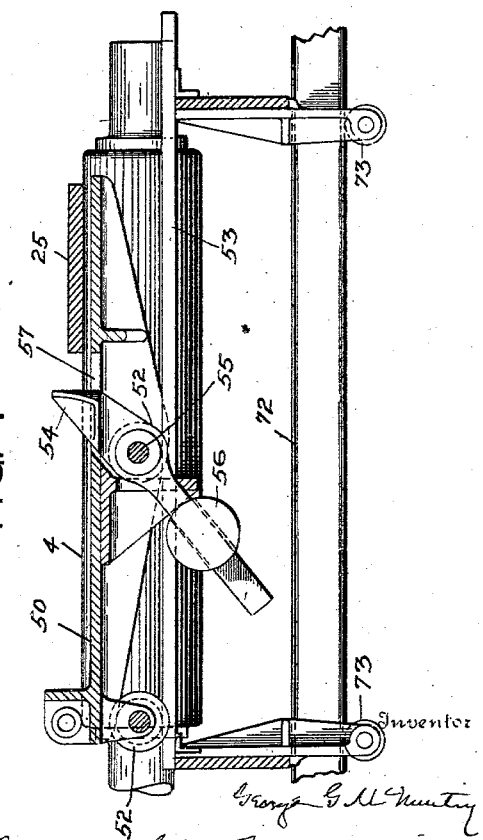
Witnesses
J. R. Keller
Robt C Totten
Inventor
George G McMurtry
By
Kay Totten & Winter
Attorneys

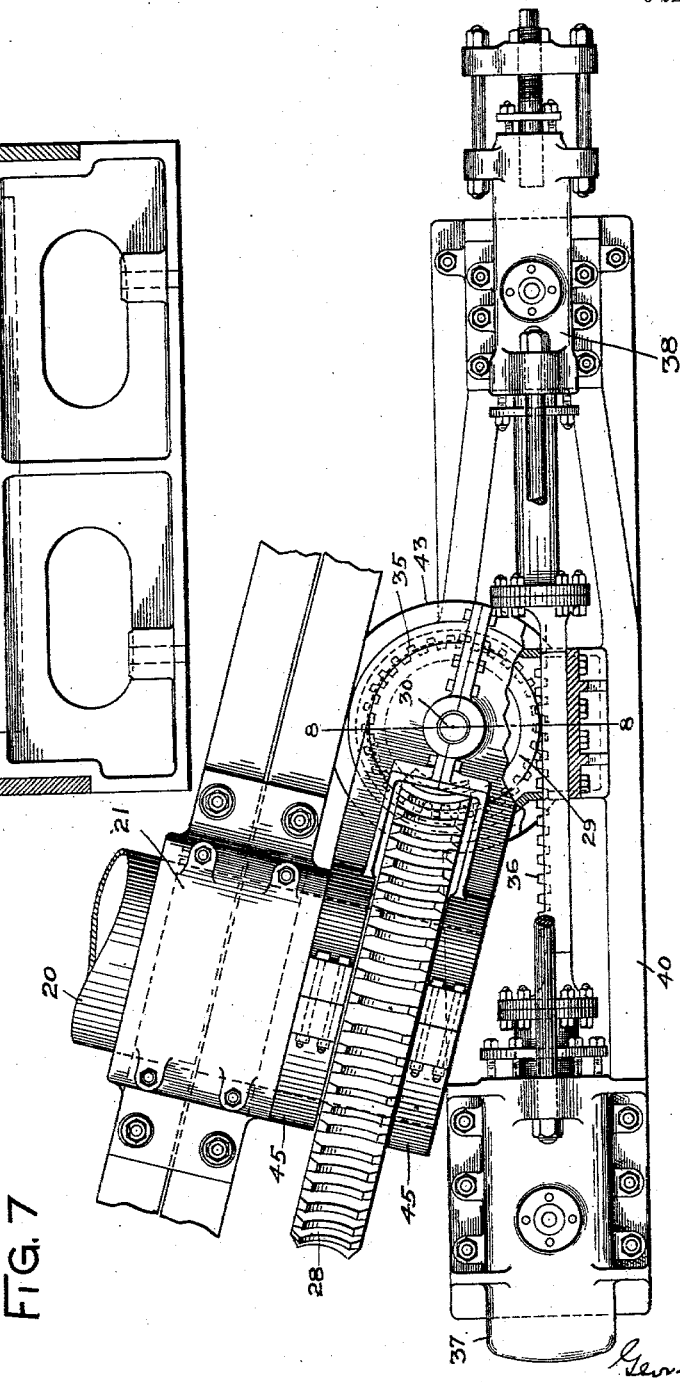

No. 753,293. PATENTED MAR. 1, 1904.
G. G. McMURTRY.
COOLING RACK FOR BARS.
APPLICATION FILED SEPT. 12, 1903.
NO MODEL. 5 SHEETS—SHEET 5.
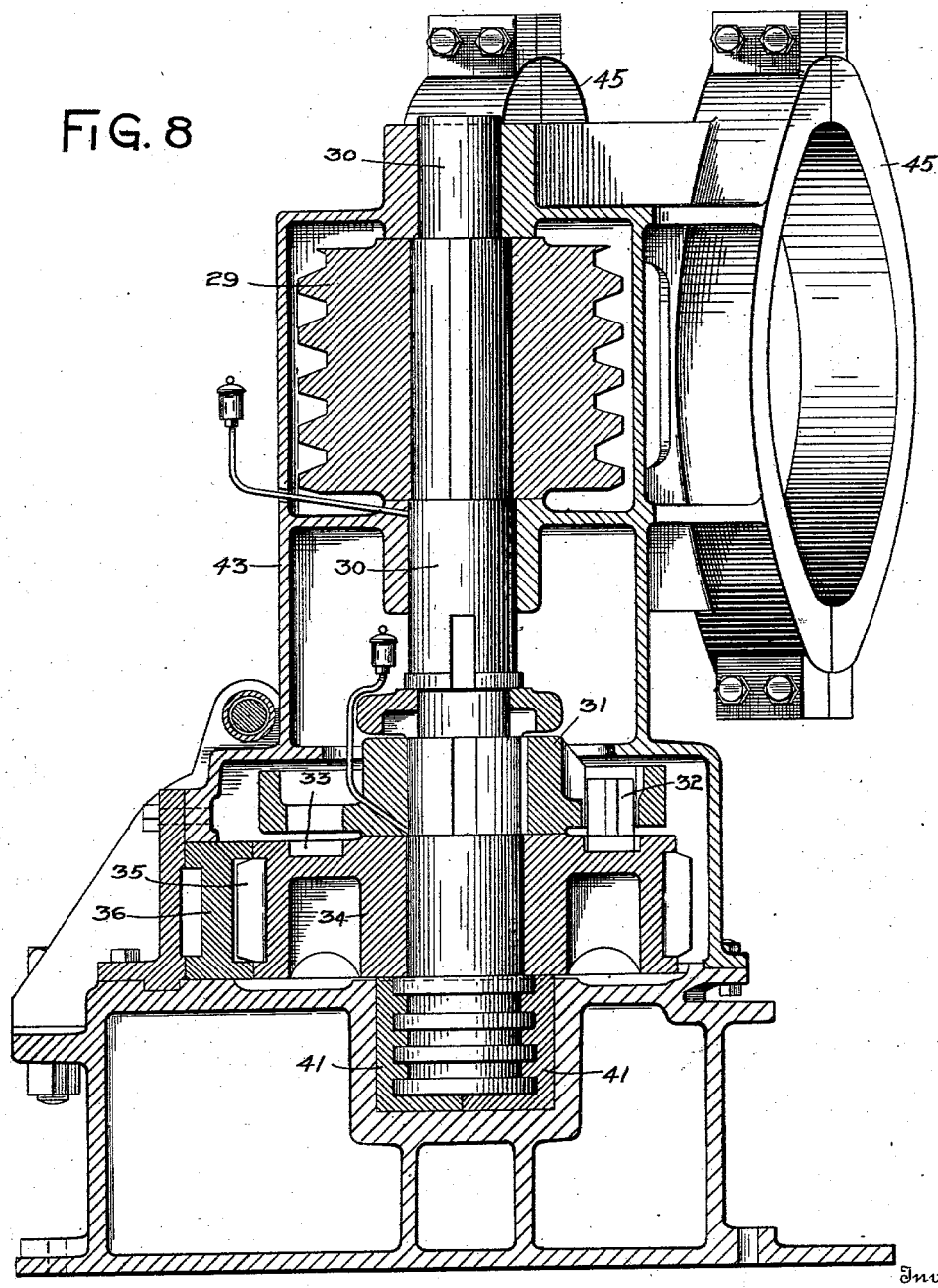

No. 753,293. Patented March 1, 1904.

UNITED STATES PATENT OFFICE.

GEORGE G. McMURTRY, OF NEW YORK, N. Y., ASSIGNOR TO AMERICAN SHEET STEEL CO., OF PITTSBURG, PENNSYLVANIA, A CORPORATION OF NEW JERSEY.

COOLING-RACK FOR BARS.

SPECIFICATION forming part of Letters Patent No. 753,293, dated March 1, 1904.

Application filed September 12, 1903. Serial No. 172,912. (No model.)

*To all whom it may concern:*

Be it known that I, GEORGE G. MCMURTRY, a resident of New York, in the county of New York and State of New York, have invented a new and useful Improvement in Cooling-Racks for Bars, &c.; and I do hereby declare the following to be a full, clear, and exact description thereof.

My invention relates to cooling-racks for use in connection with rolling-mills and the like; and its object is to provide a rack which occupies a minimum amount of space and whereby bars, rods, or the like of considerable length and weight can be cooled.

In most rolling-mills the bars, rods, or other articles coming from the mill must be cooled preparatory to further operations or storage. Generally the cooling has been done by placing the same upon skids or rails slightly inclined from the horizontal and moving the same slowly over the skids until cooled. These horizontal cooling-racks, however, occupy considerable space, as they must be made of sufficient breadth to permit the bar, rod, or other article to thoroughly cool while being moved over the same.

The object of my invention is to provide a cooling-rack for bars, rods, or the like whereby they can be thoroughly cooled and which occupies but little space on the mill-floor.

To this end the invention consists, generally stated, in a cooling-rack comprising a rotating wheel which is provided with a plurality of series of radial projections, the projections of the several series being in line with each other, so as to receive and support the bar, rod, or other article at several points, together with mechanism for slowly rotating the wheel.

The invention also comprises mechanism for pushing the bar, rod, or other article onto the wheel and means for delivering the same therefrom after being cooled.

The invention also comprises certain details of construction in a cooling-rack of the kind specified, as will hereinafter be fully described and claimed.

Figure 2:
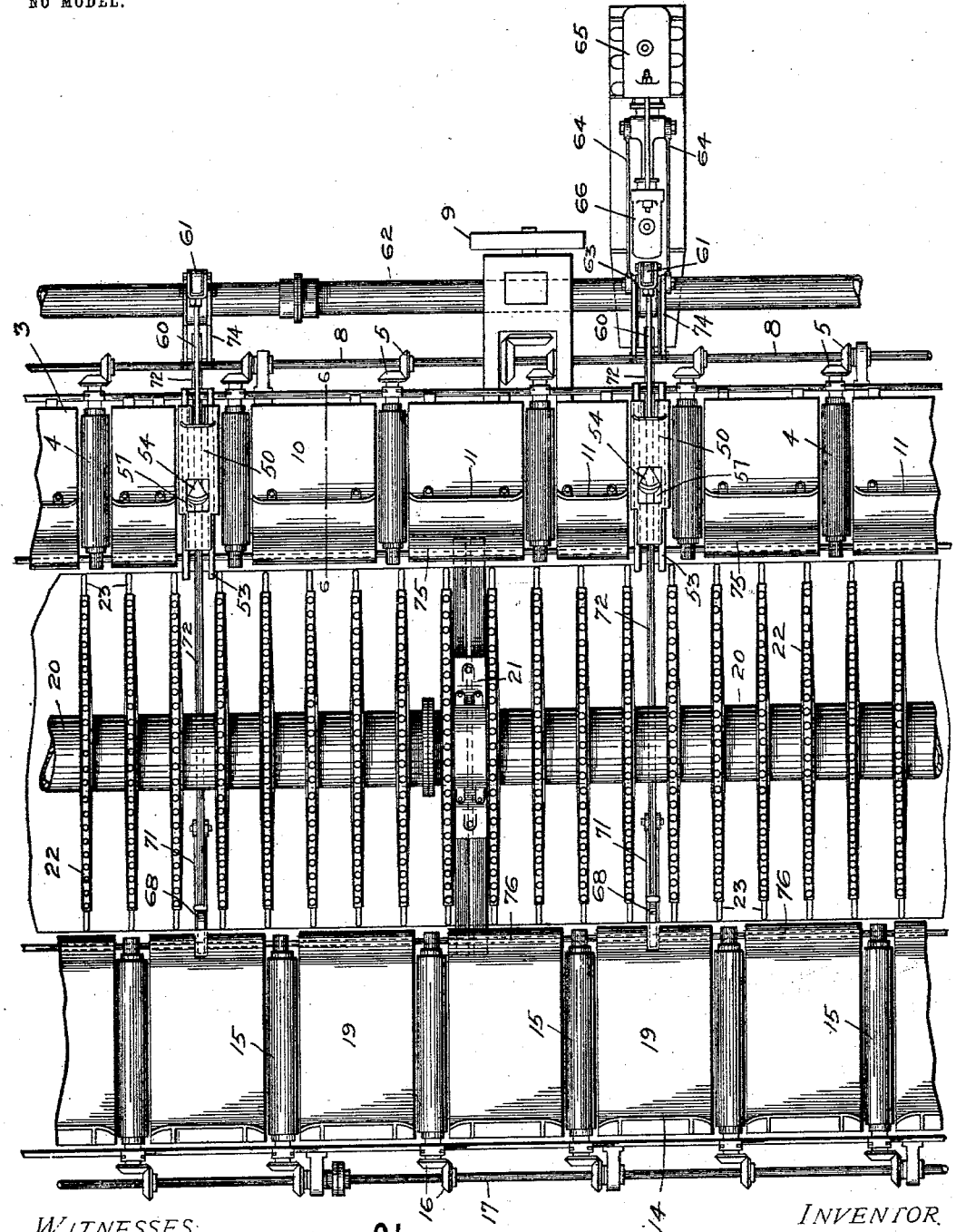

In the accompanying drawings, Figure 1 is a plan view of my cooling-rack, showing the same used in conjunction with a rolling-mill and shear. Fig. 2 is a plan view of a portion of the cooling-rack on an enlarged scale. Fig. 3 is a transverse section on the line 3 3, Fig. 1. Fig. 4 is a transverse section through the mechanism for pushing the bar into the cooling-rack. Fig. 5 is a transverse section through this pushing mechanism on the line 5 5, Fig. 3. Fig. 6 is a transverse section through the feed-table on the line 6 6, Fig. 2. Fig. 7 is a plan view, on an enlarged scale, of the mechanism for rotating the rack; and Fig. 8 is a vertical section thereof on the line 8 8, Fig. 7.

My cooling-rack has been illustrated for use in connection with a rolling-mill and shear in order to cool the bars or rods between rolling and shearing. The housings for the finishing-rolls are shown at 1, the central line of the finishing-pass of said rolls being on the line 2 2. In line with this finishing-pass is the rolling-mill table 3, the same comprising a series of live rollers 4, driven in any suitable way, such as by means of the bevel-gears 5, from the horizontal shaft 8, the latter being driven from a power-wheel 9. Interposed between the live rollers 4 are the stationary table-plates 10, which are provided with adjustable abutments 11, serving as a guide for the bar, rod, or other article coming from the finishing-pass of the rolls.

The shear is shown at 13, and this may be of any of the usual or preferred constructions. In line therewith is a shear-table 14, which in its general construction is the same as the rolling-mill table just described—that is, comprising a series of live rollers 15, driven by bevel-gears 16 from a shaft 17, the latter being driven from the power-wheel 18. Interposed between the rollers of this table are the stationary table-plates 19.

The parts so far described may be of the usual or any preferred construction of rolling-mills, shear, and tables and may be varied within wide limits.

The rolling-mill table 3 and shear-table 14 are placed side by side, as shown, and between the same is placed my improved cooling-rack, the same being of general wheel form, as shown, and comprising a shaft 20, preferably hollow, mounted in suitable bearings 21 and provided with a plurality of disks, hubs, or rims 22, each of which is provided with a series of radial projecting fingers or arms 23, the radial projections of the several series being in line with each other. The bar or other article 25 to be cooled is received in the spaces between adjacent radial projections, being supported by such projections at a plurality of points, and is carried thereby upward and around slowly, so as to permit the same to cool. The disks, hubs, or rims are sufficiently close together so that the bar, rod, or plate is prevented from sagging between adjacent radial projections on which it is supported.

The wheel will be rotated slowly and preferably intermittently. Various forms of mechanism for this purpose may be employed, that shown in the drawings comprising a worm-wheel 28, secured to the end of the shaft 20, said worm-wheel being engaged by a worm 29, fast on a vertical shaft 30, which shaft is adapted to be intermittently rotated. This intermittent rotation may be gotten in various ways, and in the drawings there is shown a ratchet-clutch mechanism comprising a member 31, fast on the shaft 30, said member being provided with a clutch-dog 32, pivotally or otherwise movably mounted thereon, which clutch-dog is adapted to engage sockets or seats 33, formed in the coöperating clutch member 34, the latter being loosely mounted on the shaft 30 and provided on its face with gear-teeth 35. The latter are engaged by a reciprocating rack-bar 36, which is connected at its opposite ends to the piston-rods of two power-cylinders 37 and 38, said cylinders being of the single-acting type and serving to reciprocate the rack-bar to and fro, the larger cylinder 37 acting to move the rack-bar to impart to the cooling-rack its forward stepwise movement, while the smaller cylinder 38 merely acts to move said rack-bar during its idle movement—that is, when the ratchet-clutch moves idly. The cylinders 37 and 38 are mounted on a suitable base-plate 40, said base-plate also having thereon a stepped bearing 41 for the lower end of the shaft 30. The worm 29 and clutch are inclosed in a suitable casing 43, perforated on opposite sides to permit of the passage of the rack-bar 36. The upper part of this casing preferably has cast integral therewith a pair of collars 45, which encircle the end of the shaft 20 on opposite sides of the worm-wheel 28, thus insuring proper engagement between the worm and worm-wheel.

It will be obvious that by admitting steam, water, or other motive fluid alternately into the cylinders 37 and 38 the rack-bar 36 will be reciprocated back and forth. During this movement in one direction—that is, when being actuated by the larger cylinder—the clutch member 34 will be rotated in a direction to cause the dog 30 to engage the clutch member 31, thereby imparting a rotary movement to the shaft 30, worm 29, worm-wheel 28, and shaft 20, while when said rack-bar moves in the opposite direction the clutch members will slide idly past each other without imparting a backward rotary movement to the shaft 20 and cooling-rack. The pistons of the power-cylinders have strokes of uniform amplitude, and the gearing is so arranged that the forward rotative movement imparted to the cooling-rack at one reciprocation of the rack-bar 36 is sufficient to move the periphery of the cooling-rack the distance between two adjacent radial projections thereon. In this manner said rack is rotated step by step a sufficient distance to always bring an open space into position to receive a bar, rod, or other object to be cooled. The number of radial projections on the wheel are such that with such step-by-step rotative movement a sufficient time will elapse during a half-rotation of the wheel to sufficiently cool the bar or other article, so that it will be in condition to be discharged therefrom.

In conjunction with this rotating rack I prefer to employ power mechanism to push the bar or other article into the wheel and also to deliver the same therefrom. The pushing-in mechanism comprises a series of reciprocating pushers 50, arranged transversely of the rolling-mill table 3 and which have been shown as small buggies or carriages provided with flat upper faces practically flush with the top face of the plates 10 of the rolling-mill table. These carriages are provided with small grooved wheels 52, running on suitable tracks 53, and mounted on each of said carriages is a pushing-dog 54, pivoted on a horizontal axis 55 and provided with a counterweight 56, which normally keeps the forward end of the dog elevated, as shown in Fig. 4, and projecting through an opening 57 in the top of the carriage, said dog when in this position being adapted to engage the bar, plate, or rod 25 and push the same into the wheel. During such pushing movement another bar, plate, or rod is apt to run onto the table from the rolling-mill, so that when the pushing-carriage 50 is retracted the pushing-dog 54 must pass underneath said bar or rod. The pivoting of the dog, as shown, permits it to swing down into the opening in the top of the carriage, so as to easily pass such new bar or rod, while the counterweight 56 will immediately project the forward end of the dog through the opening in the carriage as soon as said dog has passed the new bar or rod, thus again being in position to push said bar or rod into the cooling-rack when the carriage is again moved forward.

Various forms of mechanism may be used for reciprocating the carriages, and in the drawings I have shown said carriages connected by means of rods 60 to arms 61 on a rock-shaft 62, mounted at the side of the rolling-mill table. This rock-shaft is also provided with an arm 63, to which are connected a pair of rods or links 64, which are attached to a suitable reciprocating motor. The motor shown comprises two power-cylinders 65 and 66 of the single-acting type and having their piston-rods connected and secured to the links 64. The larger of these cylinders serves to move the pushers in their forward or active movement, whereas the smaller cylinder serves to return the pushers to their starting position. I also use suitable mechanism for delivering the bars or rods from the cooling-rack, this mechanism being shown as oscillating pushing-arms 68, pivotally mounted at their lower ends 69 in hangers 70, projecting from the shear-table. These oscillating pushers may be actuated by means of any suitable mechanism, but preferably they will be actuated in unison with the pushers in 50. I have therefore shown them connected, by means of links 71, to bars 72, mounted underneath the rolling-mill table and extending between adjacent hubs or disks on the shaft 20 to the shear-table, said rods or bars resting on antifriction-rollers 73. They are connected, by means of links 74, to arms on the rock-shaft 62, and are therefore actuated from the motor 65 and 66. A single movement of the reciprocating motor therefore will serve not only to push a bar or rod into the rack on one side, but also to push a bar or rod out of the rack on the opposite side.

The bars or rods 25 as they emerge from the rolling-mill onto the rolling-mill table have a considerable forward velocity, this movement being maintained by the live rollers of the table. This forward movement should be checked before the bar or rod is pushed onto the radial projections of the cooling-rack, and as a convenient means for thus checking the same, the stationary-plates 10 of the rolling-mill table are provided on their edges adjacent to the cooling-rack with curved elevated portions 75, the upper faces of which are slightly higher than the upper faces of the live rollers. Consequently when the bar is pushed sidewise it will slide up onto these elevated portions, thus being raised off the live rollers. This results in stopping the forward movement of the bar prior to its being pushed into the cooling-rack. Similar raised curved portions 76 are formed on the inner edges of the plates 19 of the shear-table, so that the bars will not come into contact with the live rollers of the shear-table until they are fully clear of the cooling-rack.

The operation of my device will be readily understood from the foregoing description and is as follows: The bars, plates, rods, or other articles coming from the finishing-pass of the rolling-mill pass onto the rolling-mill table 3. Each bar is pushed into the cooling-wheel by means of the reciprocating pushers 50, actuated from the power-cylinders 65 and 66. In the meantime another bar or rod will have passed onto the rolling-mill table, and in the backward movement of the pusher 50 the pushing-dog 54 will swing downwardly, so as to pass underneath said bar or rod. During this backward movement of the pusher the power-cylinders 37 and 38 will be operated to impart a stepwise forward rotary movement to the rack, thereby carrying the bar previously pushed therein upwardly and bringing the next adjacent space into position to receive the next bar. The pusher 50 is then again projected, pushing that bar off the rolling-mill table into the rack, and then the rack is again rotated a step and the pusher retracted. This operation continues in the manner just described, the bars or rods being carried upwardly and around by the cooling-rack, and by the time said rack has made a semirotation the bars and rods will be sufficiently cooled to be delivered therefrom. As soon as the first bar in the rotating rack has traveled around sufficiently far to come into the path of the oscillating pusher 68 it will be pushed out of the rack at the next forward reciprocation of the pusher 50 and will fall down upon the shear-table 14. After this each forward reciprocation of the power-cylinders 65 and 66 will not only push a bar into the wheel, but will also push another bar out of the wheel on the opposite side thereof.

The controlling-valves for the cylinders 37, 38, 65, and 66 will preferably be brought to a single point, so that a single operator will be able to cause both the rotation of the wheel and the reciprocation of the pushers. It is obvious that various modifications may be made in the details of this mechanism without departing from the spirit of my invention. The table 14 need not necessarily be a shear-table, but may be a table leading to any other mechanism or may be merely a storage place. It is also obvious that instead of using two single-acting cylinders for rotating the rack and actuating the pushers a single double-acting cylinder or any other reciprocating motor might be used for these purposes.

The rotating rack occupies a comparatively small space on the mill-floor, this being due in part to the fact that the bars or rods are carried in a curved or orbital path and in part to the fact that the spaces between the radial projections need not be materially greater than the thickness of the bar or rod, the latter being held on edge while being carried around. Due to these two factors the capacity of the wheel is fully double that of a horizontal cooling-rack, having a width equal to the diameter of the wheel, or otherwise stated the wheel occupies not more than one-half as much floor-space as would a horizontal rack of the same capacity.

What I claim is—

1. A cooling-rack comprising a wheel having a plurality of series of radial projections, the projections of the several series being in line with each other, gearing for rotating said wheel, and a power-motor for intermittently actuating said gearing.

2. A cooling-rack comprising a wheel having a plurality of series of radial projections, the projections of the several series being in line with each other, a motor provided with a reciprocating element having a fixed amplitude of reciprocation, and intermediate clutch mechanism geared to the reciprocating element of the motor and to the wheel.

3. A cooling-rack comprising a wheel having a plurality of series of radial projections, the projections of the several series being in line with each other, a driving-shaft gear to said wheel, a ratchet-clutch having one member connected to said driving-shaft, a motor provided with a reciprocating element having a fixed amplitude of reciprocation, and connecting gearing between said reciprocating element and the other member of said ratchet-clutch.

4. A cooling-rack comprising a wheel having a plurality of series of radial projections, the projections of the several series being in line with each other, a worm-wheel connected to said wheel, a worm engaging said worm-wheel, a reciprocating motor, and intermittent clutch mechanism between the same and said worm.

5. A cooling-rack comprising a wheel having a plurality of series of radial projections, the projections of the several series being in line with each other, a driving-shaft geared to said wheel, a ratchet-clutch one member of which is fast to said driving-shaft, a reciprocating rack operatively connected with the other member of said ratchet-clutch, and a reciprocating motor connected to said rack.

6. A cooling-rack comprising a wheel having a plurality of series of radial projections, the projections of the several series being in line with each other, mechanism for rotating said wheel, means on one side of said wheel for pushing the article to be cooled onto said radial projections, and means on the other side of the wheel arranged to engage the articles and deliver the same from said wheel.

7. A cooling-rack comprising a wheel having a plurality of series of radial projections, the projections of the several series being in line with each other, mechanism for rotating said wheel, a pusher on one side of said wheel for pushing the article to be cooled onto said radial projections, a pusher on the opposite side of the wheel for delivering the articles from said wheel, and connections between said pushers whereby they are operated in unison.

8. A cooling-rack comprising a wheel having a plurality of series of radial projections, the projections of the several series being in line with each other, mechanism for intermittently rotating said wheel through uniform distances, a support on one side of the wheel for the articles to be cooled, and a pusher arranged to push the articles from said support into the wheel.

9. A cooling-rack comprising a wheel having a plurality of series of radial projections, mechanism for rotating said wheel, a support on one side of the wheel for the articles to be cooled, a plurality of pushers arranged to move transversely of said support, a rock-shaft to which said pushers are connected, and mechanism for rocking said shaft.

10. A cooling-rack comprising a wheel having a plurality of series of radial projections, mechanism for intermittently rotating said wheel through uniform distances, a table at one side of said wheel, live rollers mounted in said table, a pusher moving transversely of said table, a yielding pushing-dog carried by said pusher, and mechanism for reciprocating said pusher.

11. A cooling-rack comprising a wheel having a plurality of series of radial projections, mechanism for rotating said wheel, a table at one side of said wheel, live rollers mounted in said table, stationary raised portions on said table adjacent to said wheel, and a pusher arranged to reciprocate transversely of said table.

12. A cooling-rack comprising a wheel having a plurality of series of radial projections, mechanism for rotating said wheel, a table at one side of said wheel, live rollers mounted in said table, said table having raised portions adjacent to said wheel, a pusher arranged to reciprocate transversely of said table, and a pivoted dog mounted in said pusher.

13. A cooling-rack comprising a shaft, a plurality of hubs or disks thereon, a series of radial projections on said hubs or disks, mechanism for rotating said shaft, a support on one side of said rack for receiving the articles to be cooled, a support on the opposite side upon which said articles are delivered, a pusher arranged to move transversely of the receiving-support, a pusher arranged between adjacent disks of the wheel on the side opposite the receiving-support, mechanism for actuating one of said pushers, and a rod connecting said mechanism with the other pusher.

14. A cooling-rack comprising a shaft, a plurality of hubs or disks on said shaft, radial projections on said hubs or disks, mechanism for rotating said shaft, a pusher-in on one side of the wheel arranged to move transversely with respect thereto, a rock-shaft from which said pusher-in is actuated, a bar projecting between adjacent hubs or disks, connections between the rock-shaft and said bar for reciprocating the same, a pusher-out located between adjacent hubs or disks on the side of the wheel opposite the pusher-in, and connections between the reciprocating bar and said pusher-out.

15. A cooling-rack comprising a shaft, a plurality of hubs or disks thereon, radial projections on said hubs or disks, mechanism for rotating said shaft, a reciprocating pusher-in on one side of the wheel arranged to move transversely with reference thereto, an oscillating pusher-out mounted between adjacent disks on the opposite side of the wheel, a reciprocating bar extending between adjacent hubs or disks, a link connecting said bar with the pusher-out, and mechanism for reciprocating said bar and said pusher-in.

16. A cooling-rack comprising a shaft, a series of hubs or disks thereon, radial projections on said hubs or disks, mechanism for rotating said shaft, a plurality of reciprocating pushers-in mounted on one side of the wheel and movable transversely with reference thereto, a rock-shaft for reciprocating said pushers-in, a plurality of pushers-out on the opposite side of the wheel between adjacent disks thereof, and connections between said rock-shaft and said pushers-out.

17. In cooling apparatus, the combination with a receiving-table, a delivery-table, a rotating rack between said tables, mechanism for rotating said rack, mechanism for pushing the articles from the receiving-table into the rack, and means arranged to engage the articles and deliver the same from the rack to the delivery-table.

In testimony whereof I, the said GEORGE G. McMURTRY, have hereunto set my hand.

GEORGE G. McMURTRY.

Witnesees:
W. ALLAN M. BACHE,
J. D. WICK, Jr.